Figure 1:
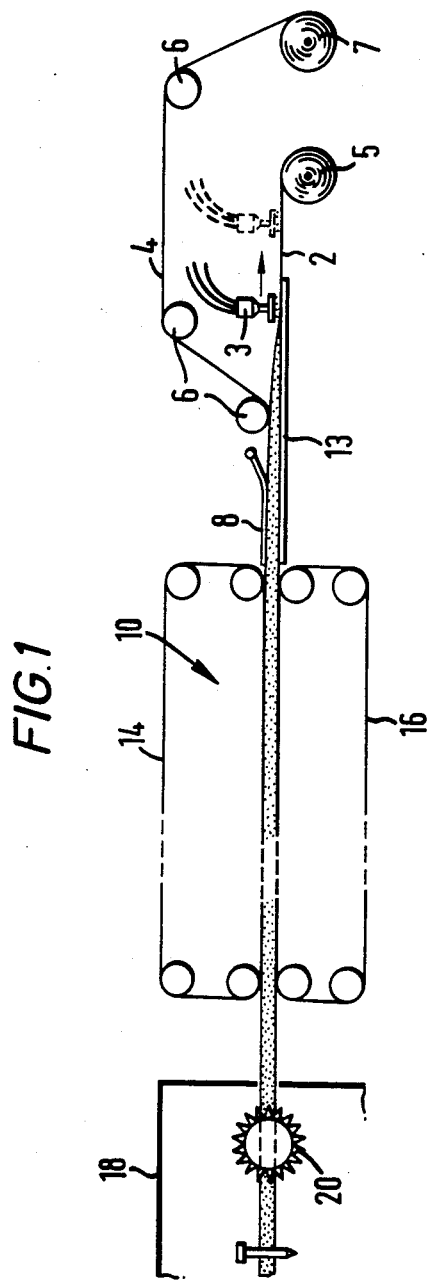

United States Patent [19]  
Marks et al.

[11] Patent Number: 4,648,922  
[45] Date of Patent: Mar. 10, 1987

[54] PROCESS FOR THE PREPARATION OF PHENOLIC FOAM

[75] Inventors: Gerald C. Marks, Cardiff, Wales; Per I. Quist, Astorp, Sweden

[73] Assignee: BP Chemicals Limited, London, England

[21] Appl. No.: 703,296

[22] Filed: Feb. 20, 1985

[30] Foreign Application Priority Data

Feb. 24, 1984 [GB] United Kingdom ............... 8404860

[51] Int. Cl.<sup>4</sup> ............................................. B32B 31/06
[52] U.S. Cl. .................................... 156/79; 156/549; 264/46.2; 425/115; 425/224; 425/817 C
[58] Field of Search ..................... 156/78, 79, 549; 264/46.2; 425/115, 224, 817 C

[56] References Cited  
U.S. PATENT DOCUMENTS 3,215,581 11/1965 Carlson et al. ............... 425/115 X  
4,267,134 5/1981 Kolakowski et al. ........... 264/46.2  
4,347,281 8/1982 Futcher et al. .................. 156/79 X  
4,501,794 2/1985 Blackwell et al. .............. 156/79 X

FOREIGN PATENT DOCUMENTS 56354 7/1982 European Pat. Off. .

Primary Examiner—Robert A. Dawson  
Attorney, Agent, or Firm—Brooks Haidt Haffner & Delahunty

[57] ABSTRACT

The present invention relates to a process and an apparatus for producing phenolic foam laminates with improved surface appearance. The process involves applying pressure on the foam forming mixture through one of its facings by a flexible member. The member is sufficiently flexible to allow continual rise of the foam but also smoothes out any uneven rise under the applied pressure thereby producing a laminate which has a surface immediately below the facing substantially free of any voids, craters or wrinkles.

6 Claims, 3 Drawing Figures

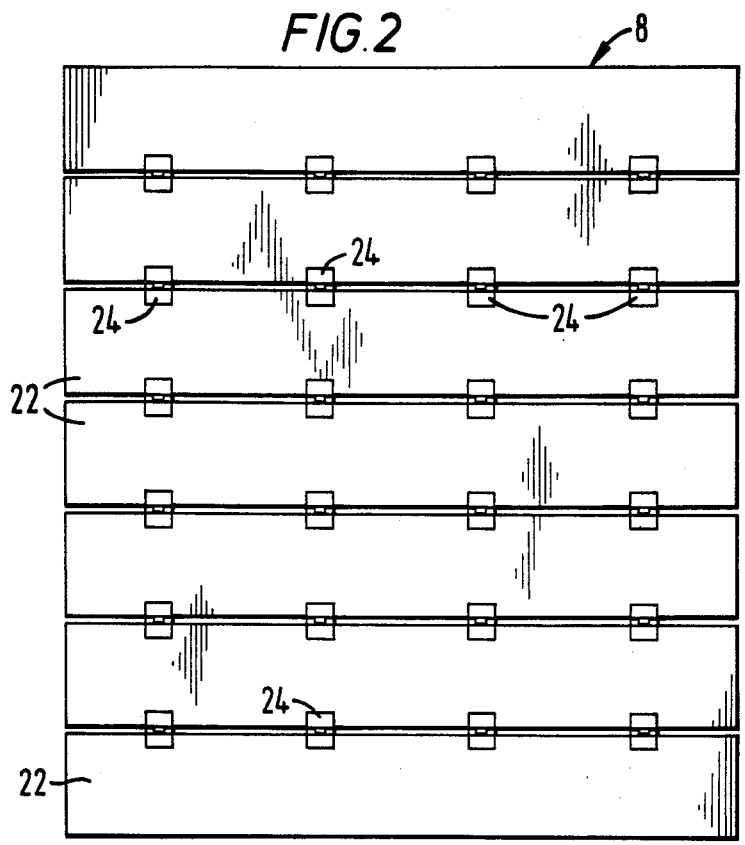

PROCESS FOR THE PREPARATION OF PHENOLIC FOAM

The invention relates to a process for the preparation of foamed materials, more particularly to foamed laminates from phenolic resins and to an apparatus for use in the process.

Foamed phenolic resins, hereinafter referred to as phenolic foams, have been previously described and have been formed into laminates or panels for use in thermal insulation. One previously described process involves dispensing a phenolic foam forming mixture of ingredients onto a moving support, which can be a continuous layer on which the mixture foams, cures and sets. Such laminates have a phenolic foam sandwiched between layers of polymeric or other material which are the so-called "facings". After rising to at least 80% of its final rise, usually 90%, the foaming mixture is passed through a conveyor press to produce a flat surface and to avoid the production of a loaf-like upper surface. Regardless of the rise of the foam at the point of entry into the conveyor press no controlled pressure is applied to the foam throughout most of its rise until the final rise is achieved in the previously described process.

The term "final rise" as used in the present specification refers to the final thickness of the product i.e. laminate when it emerges from the conveyor press.

The process may involve subsequent heating of the mixture, conveniently by passing the product through an oven.

The above described process has now been improved by applying a defined degree of pressure and optionally heat to the mixture of foam forming ingredients early in the foaming and curing process which application of pressure reduces the number of visible imperfections in the final product.

Accordingly, the present invention is a process for the production of laminates in which a phenolic foam forming mixture is dispensed between a moving upper facing and a moving lower facing, said facings moving at similar speeds, the mixture being allowed to partially foam and cure therebetween such that the mixture rises to its final thickness in a conveyor press so as to complete the foaming, curing and setting of the mixture thereby forming a laminate with the foam sandwiched between the facings, characterised in that prior to the mixture having risen to 80% of its final thickness a pressure is applied to the foaming mixture through the upper facing by a member which is sufficiently flexible to allow continual rise of the foam, said pressure being sufficient to reduce substantially the formation of voids and craters immediately below the upper facing.

By movement of the facings at similar speeds is meant that the two facings may move at speeds which differ from each other by up to 30%.

The pressure initially is suitably applied before 75% of the final rise of the foam has occurred, preferably before 60%, most preferably before 30%, for example when about 10% of the final rise has occurred. There is no minimum rise required before the application of the pressure.

The pressure applied is suitably less than 0.15 bar, preferably less than 0.10 bar, more preferably less than 0.05 bar. Applied pressure within the range 0.001 to 0.03 bar is most preferred.

The pressure is suitably applied for less than 2 minutes, preferably less than 1 minute. A preferred duration is from 5 to 30 seconds.

The foaming mixture is passed through a conveyor press as mentioned above and the pressure is applied prior to the foaming mixture entering the conveyor press.

Heat can also be applied to the upper facing on the foam forming mixture. Heat is suitably applied to raise or maintain the surface temperature of the mixture in the range of 60° to 100° C. preferably 70° to 90° C.

The duration of the heating is conveniently the same as that of the application of pressure.

Pressure and heat can be applied simultaneously.

Pressure is suitably applied by bringing a flexible member into contact with the upper facing of the rising foam, the flexibility of the member being sufficient to allow it to conform to the rising profile of the foaming mixture. The member is preferably attached at its leading edge to the base of its housing above the upper facing but is free to rise on the foam yet exerting sufficient pressure to smooth out any uneven rise therein which would lead to voids or craters on the surface of the finished laminated.

The flexible member can conveniently be in the form of a flexible sheet, of thickness and density so as to produce a pressure of the magnitude described above. The flexible member is preferably made of metal such as aluminium or stainless steel.

According to another aspect of the present invention an apparatus for applying pressure to the upper facing of a twin-faced laminate sandwiching a mixture of phenolic foam forming ingredients comprises a plurality of slats arranged lengthwise side by side substantially parallel to each other, each slat being connected to the next adjacent slat on either side and being capable of relative movement with respect to each other so as to provide a flexible member referred to hereafter as a "carpet".

The term slat does not limit the part so referred to, to any particular geometric proportions or shape. Whilst it is convenient that the slats are relatively narrow in relation to their length, the thickness of the slats is determined primarily by the need to provide a pressure within the range specified above, since the carpet in use is preferably unsupported and floats on the foam forming mixture.

The slats may be connected to each other by means of hinges to form hinged slats.

In use the apparatus will be arranged such that the slats are mounted in a transverse direction in relation to the direction of movement of the facings.

According to a further aspect of the present invention there is provided production equipment for the preparation of laminated phenolic foam and like foamed materials said production equipment comprising
  (a) means for dispensing a foam forming mixture between a moving lower facing and a moving upper facing,
  (b) means for providing said moving facings at similar speeds,
  (c) means for applying pressure to the upper facing and thereby to the foam forming mixture, said means comprising a flexible member capable of (i) allowing continual rise of the foam forming mixture and (ii) simultaneously smoothing out any uneven rise thereof, and (d) a conveyor press for applying further pressure and optionally heat to the facings and thereby to the foam forming mixture, whereby a laminate substantially free of voids and craters immediately below the facings emerges from the press.

The invention is illustrated by the accompanying drawings in which FIG. 1 is a schematic view of one embodiment of the process for the production of phenolic foam and FIGS. 2 and 3 are plan views and side views of the carpet respectively.

Referring to FIG. 1 phenolic foam forming ingredients were dispensed and spread from a mixing head onto a lower facing (2) fed at 2 meters/min from a roll (5) to form a thin layer in conventional manner. The position of the adjustable mixing head (3) was adjusted as shown by the broken lines and arrow. The lower facing (2) was passed over heatable platens (13). An upper facing (4) e.g. of glass fibre was fed from roll (7) over rollers (6) and brought into contact with the upper facing about 50 cms beyond the mixing head (3).

The leading edge of a carpet (8) whose construction is described below was located at 80 cms beyond the mixing head (3). As the foam rose it built up against the carpet (8) as the latter floated on the upper facing on the foaming mixture. Immediately after emerging from the carpet, the laminate was passed into the heated conveyor press (10) comprising a top conveyor (14) and a bottom conveyor (16) and then through a sawing unit (18) where the foamed laminate was cut into panels of chosen size. The sides were trimmed by a side trimming saw (20). Further experiments were carried out using other line speeds and carpet lengths as set out in Table 1, the distances being adjusted according to line speeds.

In the Examples the carpet (8) was heated electrically to about 120° C. to apply heat to the upper facing on the foaming mixture. The lower facing and thereby the underside of the mixture was also heated through electrically heated base platens (13) in a similar manner.

At the start of a run the facings moving at closely similar speeds with the foaming mixture therebetween were passed without contact with the carpet, the latter being raised by means of hydraulic arms (not shown). Then the carpet (8) was lowered to contact the upper facing before 30% of the final rise of the foam had taken place.

The carpet (8) was allowed to float on the upper facing protecting the foaming mixture which together with the facing continued to rise under the carpet.

The Examples are summarised in Table 1.

The laminated foams produced were superior to those produced without the use of the carpet in the following respects:

(a) visible defects were reduced, in particular voids and craters immediately below the surface of the facing of the foam were significantly reduced.
(b) the foams had improved adhesion to fibrous glass mat used as facing and also to lacquered aluminium foil.
(c) a more uniform density of foam was achieved through the thickness of the panel or laminate.
(d) a faster cure rate was achieved for any given foam formulation and hence production speed could be increased.

TABLE 1

|  | Example 1 | Example 2 | Example 3 | Example 4 |
|---|---|---|---|---|
| carpet width m (slat length) | 0.65 | 1.0 | 1.25 | 1.5 |
| length of carpet (m) | 0.65 | 1.1 | 1.1 | 1.5 |
| pressure (bar) (pressure of carpet due to its own weight) | 0.0028 | 0.0056 | 0.0056 | 0.0019 |
| maximum additional load on any slat (kg) (metal weight added) | 10 | 28 | 28 | 0 |
| extra maximum pressure (bar) (from metal weight) | 0.016 | 0.014 | 0.0112 | 0 |
| total maximum pressure (bar) | 0.019 | 0.02 | 0.017 | 0.0019 |
| line speed m/min | 2 | 3.5 | 3.5 | 2 |
| contact time at high temperature (secs) | 12–15 | 7–18 | 7–18 | 33 |
| time at maximum pressure (secs) | 6 | 10 | 10 | 39 |

Referring to FIGS. 2 and 3 the carpet (8) used in Example 2 is shown in plan view and comprises seven aluminium slats (22) each 1 m in length and 15 cm in width arranged side by side, each slat (22) being joined to its adjacent slat by four hinges (24). The gap between adjacent slats is 5 mm, and the thickness of the slats is 1.5 cm.

In another series of Examples (5–9) similar to Example 2, but using a pre-lacquered aluminium facing instead of glass fibre mats, carpet temperatures were varied between 90° C. and 130° C. The adhesive strength (as measured by Sattec adhesion testing apparatus) between the facings and the foam therebetween in the resultant laminate increased with increasing carpet temperature.

The results are tabulated below in Table 2.

TABLE 2

| Example | 5 | 6 | 7 | 8 | 9 |
|---|---|---|---|---|---|
| Carpet temperature (°C.) | 90 | 100 | 110 | 120 | 130 |
| Facing adhesion (kg/cm$^2$) | 0.12 | 0.15 | 0.22 | 0.25 | 0.35 |

We claim:

1. A process for the production of laminates in which a phenolic foam forming mixture is dispensed between a moving upper facing and a moving lower facing, said facings moving at similar speeds, the mixture being allowed to partially foam and cure therebetween such that the mixture rises to its final thickness in a conveyor press so as to complete the foaming, curing and setting of the mixture thereby foaming a laminate with the foam sandwiched between the facings, characterised in that prior to the mixture having risen to 80% of its final thickness a pressure is applied to the foaming mixture through the upper facing by a member which is sufficiently flexible to allow continual rise of the foam, said pressure being sufficient to reduce substantially the formation of voids and craters immediately below the upper facing, wherein the flexible member is made of metal, wherein said upper facing is selected from the group consisting of lacquered aluminium and glass fibre mat, wherein said lower facing is selected from the group consisting of lacquered aluminium and glass fibre mat, and further comprising heating said flexible member to a temperature between 90° C. and 130° C., so that the adhesive strength between the facings and the foam therebetween in the resultant laminate increases with increasing flexible member temperature.

2. A process according to claim 1, wherein the pressure is applied by the flexible member simultaneously with heating the flexible member.

3. An apparatus for applying pressure to the upper facing of a twin-faced laminate sandwiching a mixture of phenolic foam forming ingredients comprising a plurality of slats arranged lengthwise side by side substantially parallel to each other, each slat being connected to the next adjacent slat on either side and being capable of relative movement with respect to each other so as to provide a flexible member carpet, wherein said carpet is made of metal, wherein said upper facing is selected from the group consisting of lacquered aluminium and glass fibre mat, and further comprising means for heating said carpet to a temperature between 90° C. and 130° C., so that the adhesive strength between the facings and the foam therebetween in the resultant laminate increases with increasing carpet temperature.

4. An apparatus according to claim 3, wherein said heating means heats said carpet, while said carpet is simultaneously applying pressure to the upper facing of said twin-faced laminate sandwiching said mixture of phenolic foam forming ingredients.

5. Production equipment for the preparation of laminated phenolic foam and like foamed materials, said equipment comprising (a) means for dispensing a foam forming mixture between a moving lower facing and a moving upper facing, (b) means for providing said moving facings at similar speeds, (c) means for applying pressure to the upper facing and thereby to the foam forming mixture, said means comprising a flexible member capable of (i) allowing continual rise of the foam forming mixture and (ii) simultaneously smoothing out any uneven rise thereof, and (d) a conveyor press for applying further pressure and optionally heat to the facings and thereby to the foam forming mixture whereby a laminate substantially free of voids and craters immediately below the facings emerges from the press, wherein said flexible member is made of metal, wherein the lower facing is selected from the group consisting of lacquered aluminium and glass fibre mat, wherein the upper facing is selected from the group consisting of lacquered aluminium and glass fibre mat, and further comprising (e) means for heating said flexible member to a temperature between 90° C. and 130° C., so that the adhesive strength between the facings and the foam therebetween in the resultant laminate increases with increasing flexible member temperature.

6. Production equipment according to claim 5, wherein said heating means heats said flexible member, while said flexible member is simultaneously applying pressure to said upper facing and thereby to said foam forming mixture.

* * * * *